Inventor: Howard C. Lawton
By his Attorney:

Patented July 23, 1940

2,208,766

UNITED STATES PATENT OFFICE 2,208,766

METHOD OF SEALING OFF POROUS FORMATIONS

Howard C. Lawton, Berkeley, Calif., assignor to Shell Development Company, San Francisco, Calif., a corporation of Delaware Application January 16, 1939, Serial No. 251,148

8 Claims. (Cl. 166—21)

The present invention pertains to a chemical method for plugging or sealing off porous formations, and is particularly suited for treatment of gas and oil wells.

Many chemical methods have been proposed to seal off porous formations traversed by oil wells. For this purpose, a treating solution is usually introduced into the well, forced into the layer to be sealed off, and caused to deposit a sealing precipitate in the pores of said layer by reaction with a second solution introduced thereinto, or with certain salts naturally present in the formation waters.

In cases where it is desired to effect a solidifying action deep within the formation, a method involving the use of two separate treating solutions which react immediately to form a precipitate is not desirable because a large portion of the precipitate is formed in a region immediately adjacent the borehole. More desirable would be a method using one treating solution wherein the time of gel or precipitate formation can be easily controlled and hence, solidification deep in the formation can be obtained.

It is therefore an object of this invention to provide a method for sealing off porous formations which consists in introducing thereinto a single treating solution capable of a reaction between the constituents thereof to form a plugging precipitate at a desired controllable rate at any desired depth of penetration.

Figure 1:
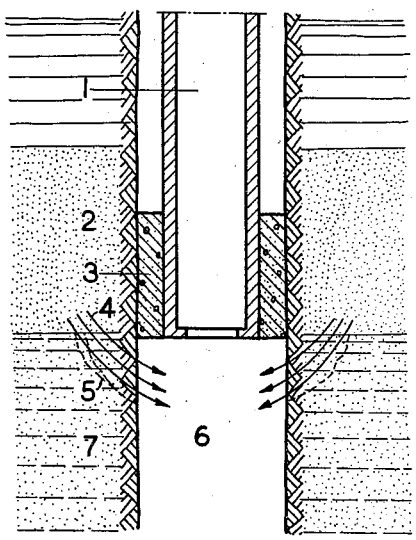
Figure 2:
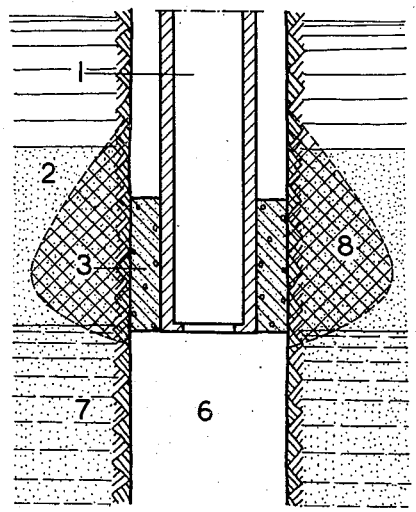

This and other objects of the invention will be understood from the following description taken with reference to the attached drawing, wherein Fig. 1 illustrates a conventional method of cementing a well at the level of the interface of a gas and of an oil-bearing layer, and Fig. 2 illustrates the application of the present method as a preliminary step in such process.

The method of the present invention broadly comprises the steps of introducing into the formation to be sealed off an aqueous solution comprising a water-soluble silicate and a gel-producing reagent which by hydrolysis is capable of maintaining the hydrogen-ion concentration of the solution at or near the iso-electric point of silicic acid, whereby said solution forms a plugging precipitate of silicic acid gel within the pores of the formation at a controllable rate, depending on the proportion and conditions used. The iso-electric point of silicic acid is between pH=7.0 and pH=8.0, with the maximum rate of gel formation at pH=8.0.

As soluble silicates, the alkali metal salts of silicic acid such as the Li, Na, and K salts may be used for the purpose of the present invention.

As gel-producing reagents capable of controlling the rate of gel formation, weak bases or salts of weak bases that are soluble in basic solutions may be used in carrying out the process of the present invention. For example, weak bases that can be used for this purpose are ammonium hydroxide, pyridine, piperidine, triethanolamine, etc.; salts of weak bases and strong acids that can be used are ammonium chloride, sulphate, and nitrate, and the hydrochlorides of aniline, pyridine, piperidine, triethanolamine, triamylene, nitrogen bases, etc.; salts of weak bases and weak acids that may also be used are ammonium acetate, tartrate and citrate, triethanolamine acetate, etc. Salts of metals like Ca, Mg and Al, which form insoluble hydroxides are not suitable for the purpose of the present invention because it has been found that these compounds react on mixing with soluble silicate solutions to form precipitates, e. g., insoluble silicates, too quickly for the purpose of the present invention.

In a preferred method of applying the invention to an oil well for the purpose of decreasing the permeability of certain porous strata therein, an aqueous solution comprising a desired amount of a soluble silicate, e. g., $Na_2SiO_3$, and a desired amount of a gel-producing reagent, e. g., $(NH_4)_2SO_4$, is introduced into the well and forced into the porous formation to be sealed off. The flow of the treating solution is preferably directed by means of packers into the desired formations. The silicate solution is held in the formation by pressure applied by any of the well known methods for a sufficient period of time to insure gel formation within the pores. The well may then be produced in the normal manner. In cases where solidifying action deep in the formation is not essential, a method of applying the present invention may comprise the steps of introducing into water or gas producing formations an aqueous solution of the gel-producing reagent, such as for example, ammonium sulphate or acetate, followed by a charge of water to separate this reagent from subsequently introduced chemicals, and then introducing an aqueous solution of a soluble silicate, followed by a small amount of water and another charge of gel-producing reagent.

The rate of gel formation or precipitatiton of silicic acid can be easily controlled by the amount of gel-producing compound added to the silicate solution under given temperature conditions. Reference may be had to Tables I and II in calculating the amount of gel-producing compound to be added to the silicate solution in order to yield a gel at the desired time. All tests described in the tables were made with ten volumes of a sodium silicate solution containing about 15.2% sodium silicate by weight.

TABLE I

Rate of gel formation of sodium silicate solution—
Temperature=50° C.=122° F.

| Gel producing reagent | Volume added | Time for gel formation |
|---|---|---|
| Pyridine hydrochloride, 10% by weight solution. | 2.5 | Longer than 23 hours. |
| | 3.0 | 2 hours, 24 minutes. |
| | 3.5 | 33 minutes. |
| | 4.0 | 17 minutes. |
| Ammonium sulphate, 10% by weight solution. | 2.0 | Soln. did not gel in 24 hours. |
| | 2.25 | 6 hours. |
| | 2.50 | 4 hours, 17 minutes. |
| | 2.75 | 2 hours, 20 minutes. |
| | 3.00 | 18 minutes. |
| | 3.50 | 5 minutes. |
| Ammonium chloride, 10% by weight solution. | 2.0 | Longer than 23 hours. |
| | 2.5 | 22 hours, 40 minutes. |
| | 3.0 | 40 minutes. |
| | 3.5 | 8 minutes. |
| Ammonium acetate, 10% by weight solution. | 2.5 | Longer than 23 hours. |
| | 3.0 | Longer than 23 hours. |
| | 4.0 | 4 hours, 36 minutes. |
| | 5.0 | 55 minutes. |

TABLE II

Rate of gel formation of sodium silicate solution—
Temperature=25° C.=77° F.

| Gel producing reagent | Volumes added | Time for gel formation |
|---|---|---|
| Pyridine | 0.5 | Longer than 22 hours. |
| | 1.0 | 1 minute. |
| | 2.5 | 0 minutes. |
| Pyridine hydrochloride, 10% by weight solution. | 2.5 | Longer than 19 hours. |
| | 4.0 | 6 minutes. |
| | 5.0 | 3 minutes. |
| | 10.0 | 0 minutes. |
| Ammonium sulphate, 10% by weight solution. | 2.25 | Soln. did not gel in 24 hours. |
| | 2.50 | 5 hours. |
| | 2.75 | 4 hours, 15 minutes. |
| | 3.00 | 1 hour, 28 minutes. |
| | 3.50 | 14 minutes. |
| | 4.00 | 3 minutes. |
| Ammonium chloride, 10% by weight solution. | 2.5 | Longer than 5½ hours, less than 18½ hours. |
| | 3.0 | 67 minutes. |
| | 4.0 | 5 minutes. |
| | 5.0 | 0 minutes. |
| Ammonium acetate, 10% by weight solution. | 2.5 | Longer than 19 hours. |
| | 4.0 | 6½ hours. |
| | 5.0 | 20 minutes. |
| | 10.0 | 0 minutes. |

It can readily be seen from the above tables that the rate of gel formation can be easily and accurately controlled, and gel formation in the premixed homogeneous solution can be made to take place at any predetermined time. In well drilling practice mixtures forming silicic acid gels in 4 to 24 hours are generally preferred.

The process of the present invention depends, it is believed, on the action of a gel-producing reagent which hydrolyzes to yield hydrogen ions which react with the soluble silicate to form silicic acid gel, according to the following example:

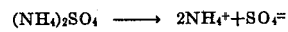

$$(NH_4)_2SO_4 \longrightarrow 2NH_4^+ + SO_4^=$$
$$2NH_4^+ + 2H_2O \longrightarrow 2NH_4OH + 2H^+$$
$$2H^+ + Na_2SiO_3 + H_2O \longrightarrow Si(OH)_4\downarrow + 2Na^+$$

Although the precipitate formed has been called silicic acid gel and shown in the example as having the formula $Si(OH)_4$, it is to be understood that it is quite probable that condensed or polymerized silicic acid molecules or complexes may be formed from the reaction or subsequent reactions.

Weak bases and salts of weak bases which yield solutions with a pH of about 4.0–6.5 are preferred although other gel-producing compounds can be used which give solutions of a pH somewhat above or below this range. Hence ammonium acetate is suitable for use as a gel-producing compound in the process.

As already stated, the present invention affords several distinct advantages over prior methods. Among these, the method has the advantage of making it possible to use a single premixed solution of a soluble silicate and a gel-producing reagent that can be prepared on the surface and made to penetrate some distance into the strata before gel formation takes place. The use of one solution has the further advantage that the plug is uniformly distributed from the well to as deep a penetration as may be desired. The strength of the gelatinous silicic acid due to its fibrillar structure is desirable in sealing off water and gas producing strata.

In some cases it may be advantageous to complete the application of the present method by injecting a cement slurry into the formation. Hence, after injecting the aqueous treating solution a cement milk may be pumped into the formation in any well known manner, such as for instance, dumping into the well a charge of cement milk and forcing the cement into the formation by means of an overburden of oil, or the like.

For example, the present method may be used to especial advantage in the case of wells passing through relatively narrow oil and gas layers closely adjoining each other.

Referring to Fig. 1, such a well is shown at 6, passing through a gas layer 2 and an oil layer 7, the shoe of a casing string 1 being cemented as shown at 3, at the level of the interface of the gas and oil layers 2 and 7.

If the gas layer 2 holds gas at a considerable pressure, this gas will tend to force its way into the borehole through a path of least resistance around the lower edge of the casing and the cement behind it, and through the annular-conical upper portion 5 of the porous oil layer, as shown by the arrows at 4, sometimes forcing sand particles into the well, eating away the formation, and causing an undesirable phenomenon known as "coning."

Since coning in such cases cannot be eliminated without cementing the casing at a considerably lower level than shown in Fig. 1, and thereby materially decreasing the production from the oil layer, the process of the present invention may be advantageously used as a preliminary operation, as shown in Fig. 2, in order to form an annular plug 8 around the borehole by injecting the desired reagent into the gas layer, and thereafter lowering and cementing the casing as before at the level of the desired interface. The solidified ground portion 8 will form an effective obstacle to the path of the flow of gas from the gas layer around the lower edge of the casing, and coning will be substantially eliminated.

Substantially the same procedure may also be followed when coning occurs during production at the interface of two layers, for example, behind a perforated casing or liner. A reagent prepared according to this invention and a charge of cementing slurry are in such cases forced into the formation through said perforations.

As an example of the above, the method of the present invention was applied to a well which produced substantially only dry gas through perforations placed at 6362 to 6366 feet. For treating purposes, a cement retainer was set at 6360 feet, perforations were made at 6342 to 6352 feet and a second retainer set above these perforations. Through the perforations between the retainers 120 barrels of a solution prepared by mixing 4 volumes of a 15.2% sodium silicate solution with one volume of an 8.6 percent solution of ammonium sulphate were injected into the formation. Two days later, 118 barrels of a solution prepared by mixing 4 volumes of a 15.2% sodium silicate solution with one volume of 10 percent ammonium sulphate were injected. Following these injections the well was kept closed in for 48 hours to allow time for the chemicals to react. Cement was then injected to close the perforations at 6342 to 6352 feet, the cement retainers drilled out and the well swabbed until production began through the perforations at 6362 to 6366 feet. This production was started ten days after the last injection. Several weeks later the well was producing 250 to 320 barrels of oil per day with a gas/oil ratio of only 150 to 164 cubic feet per barrel.

Although the process of this invention has been described with regard to its application in well-drilling practice, it is obvious that it can equally well be applied to sealing off and decreasing the permeability of any desired ground formation. Thus, the present invention may have a practical application in building canals, sluices, or dykes in porous soil, where it is desirable to stop the percolation of water through the sand, or in consolidating porous road beds or the like, or in constructing landing piers, tunnels, etc., in ground formations which are not sufficiently impervious to fluid flow.

I claim as my invention:

1. In the process of decreasing the permeability of porous ground the step of introducing thereinto a treating mixture consisting of an aqueous solution of a water-soluble silicate, and a compound selected from the group consisting of weak bases and their non-metallic salts soluble in basic solution, and allowing a controlled formation of a silicic acid gel to take place within the pores of the ground by the reaction of said two liquids.

2. In the process of decreasing the permeability of porous ground the step of introducing thereinto a treating mixture consisting of an aqueous solution of a water-soluble silicate, and a compound selected from the group consisting of weak bases and their non-metallic salts soluble in basic solution, allowing a controlled formation of a silicic acid gel to take place within the pores of the ground by the reaction of said two liquids and thereafter introducing a cement slurry into the formation.

3. In the process of decreasing the permeability of a porous formation, the steps of introducing thereinto a mixture consisting of aqueous solutions of sodium silicate and ammonium sulfate.

4. In a method for treating a well traversing a gas bearing formation immediately adjoining an oil-bearing formation the steps of introducing into the well and forcing into the gas formation a treating mixture consisting of an aqueous solution of a water-soluble silicate and a compound selected from the group consisting of weak bases and their non-metallic salts soluble in basic solution, allowing a controlled formation of a silicic acid gel to take place within the pores of the ground by the reaction of said two liquids, forcing a cement slurry into the well to form an annular seal along the walls of the borehole at substantially the level of the interface between the gas and the oil-bearing layers, and subsequently producing oil from the oil-bearing layer.

5. In the process of decreasing the permeability of porous ground the step of introducing thereinto a treating mixture consisting of an aqueous solution of a water-soluble silicate, and a weak base, and allowing a controlled formation of a silicic acid gel to take place within the pores of the ground by the reaction of said two liquids.

6. In the process of decreasing the permeability of porous ground the step of introducing thereinto a treating mixture consisting of an aqueous solution of a water-soluble silicate, and a weak organic base, and allowing a controlled formation of a silicic acid gel to take place within the pores of the ground by the reaction of said two liquids.

7. In the process of decreasing the permeability of porous ground the step of introducing thereinto a treating mixture consisting of an aqueous solution of a water-soluble silicate, and a salt of a weak base, and allowing a controlled formation of a silicic acid gel to take place within the pores of the ground by the reaction of said two liquids.

8. In the process of decreasing the permeability of porous ground the step of introducing thereinto a treating mixture consisting of an aqueous solution of a water-soluble silicate, and a salt of a weak organic base, and allowing a controlled formation of a silicic acid gel to take place within the pores of the ground by the reaction of said two liquids.

HOWARD C. LAWTON.